(12) United States Patent
Kanazawa et al.

(10) Patent No.: US 7,496,046 B2
(45) Date of Patent: Feb. 24, 2009

(54) PACKET COMMUNICATION QUALITY MEASUREMENT METHOD AND SYSTEM

(75) Inventors: Toshiyuki Kanazawa, Tokyo (JP); Keisuke Ishibashi, Tokyo (JP); Masaki Aida, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1249 days.

(21) Appl. No.: 10/225,724

(22) Filed: Aug. 21, 2002

(65) Prior Publication Data
US 2003/0053419 A1  Mar. 20, 2003

(30) Foreign Application Priority Data

Aug. 22, 2001 (JP) .............................. 2001-251104
Mar. 25, 2002 (JP) .............................. 2002-082770

(51) Int. Cl.
*H04L 12/26* (2006.01)
*G06F 11/00* (2006.01)
*G06F 15/173* (2006.01)

(52) U.S. Cl. ....................... 370/252; 370/232; 709/224
(58) Field of Classification Search ....................... None
See application file for complete search history.

(56) References Cited

U.S. PATENT DOCUMENTS

| | | | | |
|---|---|---|---|---|
| 5,274,625 A * | 12/1993 | Derby et al. | ................. | 370/233 |
| 5,521,907 A * | 5/1996 | Ennis et al. | ................. | 370/253 |
| 5,535,193 A * | 7/1996 | Zhang et al. | ................. | 370/253 |
| 6,058,102 A * | 5/2000 | Drysdale et al. | ............ | 370/252 |
| 6,112,236 A * | 8/2000 | Dollin et al. | ................. | 709/224 |
| 6,144,967 A * | 11/2000 | Nock | ..................... | 707/103 R |
| 6,147,998 A * | 11/2000 | Kelley et al. | ............. | 370/395.1 |
| 6,201,791 B1 * | 3/2001 | Bournas | ...................... | 370/234 |

(Continued)

FOREIGN PATENT DOCUMENTS

EP  0786883 A  7/1997

(Continued)

OTHER PUBLICATIONS

K. Ishibashi et al., "Estimation Accuracy of the Active/Passive Collaboration-Type Measurement Scheme".

M. Aida et al., CoMPACT-Monitor: Change-of-Measure based Passive/Active Monitoring Weighted Active Sampling Shame to Infer QoS—.

(Continued)

*Primary Examiner*—Chi H Pham
*Assistant Examiner*—Warner Wong
(74) *Attorney, Agent, or Firm*—Blakely, Sokoloff, Taylor & Zafman

(57) ABSTRACT

A packet communication quality measurement method and system in which two quality measurement devices connected via a packet communication network exchange a probe packet via the network. The packet communication quality is calculated based on the transmission/reception status of the probe packet. Probe packets are intermittently transmitted from one quality measurement device to another via the network at a predetermined interval, and received by the other device. The communication quality of each probe packet is calculated based on the transmission/reception status of the probe packet. The communication quality of user packets is estimated by weighting the communication quality of probe packets in accordance with the number of user packets flowing in a desired measurement direction along the path which connects the quality measurement devices at an interval between transmission of a previous probe packet and transmission of the probe packets.

2 Claims, 9 Drawing Sheets

U.S. PATENT DOCUMENTS

| | | | |
|---|---|---|---|
| 6,321,264 B1 * | 11/2001 | Fletcher et al. | 709/224 |
| 6,430,160 B1 * | 8/2002 | Smith et al. | 370/252 |
| 6,556,540 B1 * | 4/2003 | Mawhinney et al. | 370/229 |
| 6,738,349 B1 * | 5/2004 | Cen | 370/231 |
| 6,831,890 B1 * | 12/2004 | Goldsack et al. | 370/229 |
| 6,853,619 B1 * | 2/2005 | Grenot | 370/232 |
| 2004/0218546 A1 * | 11/2004 | Clark | 370/252 |

FOREIGN PATENT DOCUMENTS

| | | |
|---|---|---|
| JP | 62-176239 A | 8/1987 |
| JP | 11-275079 | 10/1999 |
| JP | 2001-053792 A | 2/2001 |
| JP | 2001-268131 A | 9/2001 |
| WO | WO 00/51292 A | 8/2000 |

OTHER PUBLICATIONS

"IS Simulation for the Waiting Time of ATM Burst Cell Traffic", T. Ueda, vol. J82-B, No. 10, pp. 1782-1790, Oct. 1999.

"On a Change-of-Measure Algorithm for Rare-Event Estimation by Simulations", Technical Report of IEICE, 8 pages, Jun. 1999.

"Active/Passive Colaboration-Type Performance Measurement Scheme using change-of-Measure Framework", K. Ishibashi, et al., Technical Report of IEICE, The Institute of Electronics, pp. 89-95, Sep. 2001.

"A Study on precision of a performance measurement scheme using a change-of-measure framework", T. Kanazawa, et al., Proceedings of the 2002 IEICE General Conference, Mar. 27-30, 2002, Waseda University, Tokyo.

"Concept of Lightweight and Efective QoS Monitoring BAsed on Change-of-Measure Framework", M. Aida, et al, Proceedings of the 2001 Communications Society Conf. of IECE, University of Electro-Communications Choufu, Sep. 18-21, 2001.

* cited by examiner

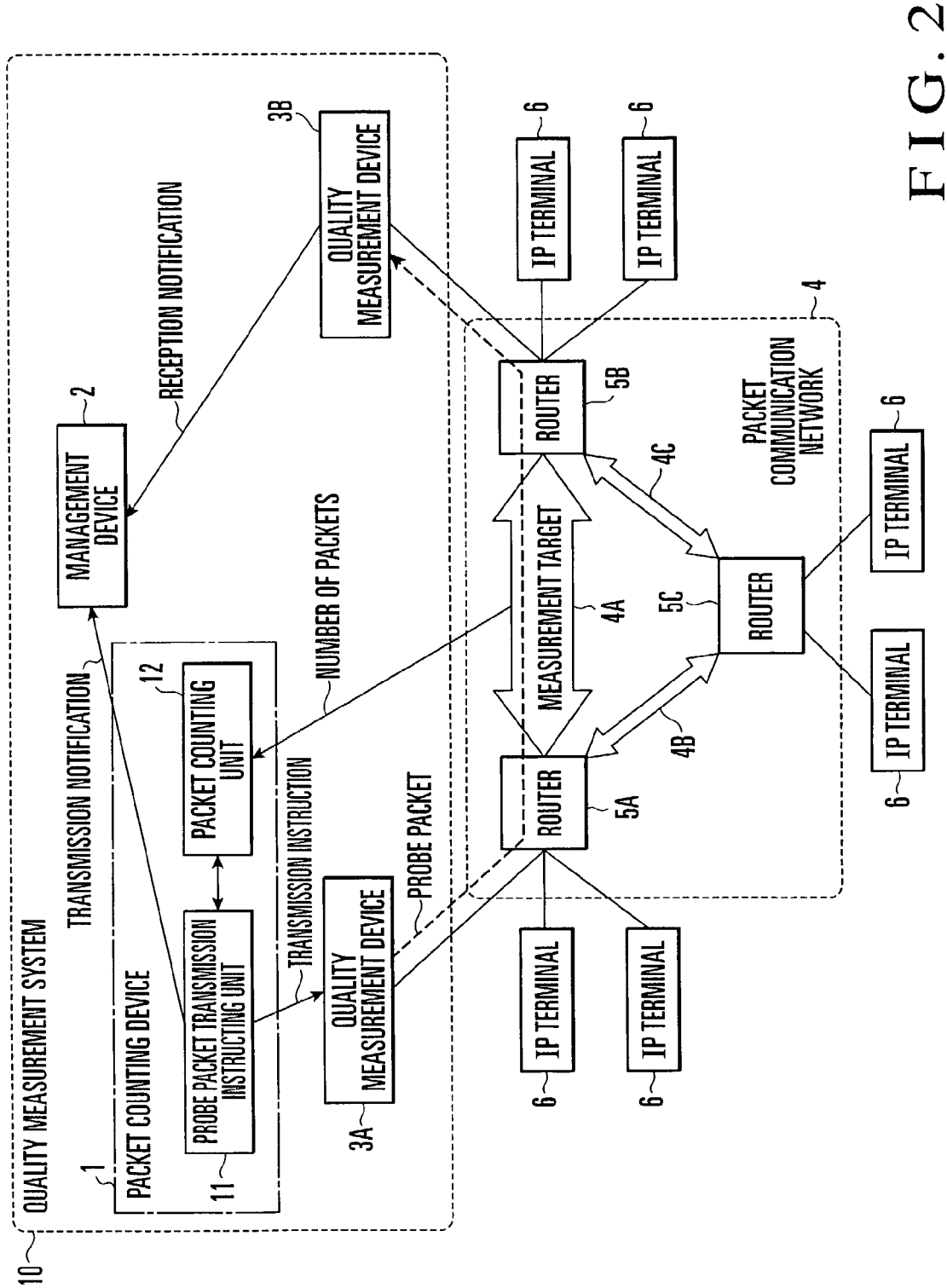
F I G. 2

PACKET COMMUNICATION QUALITY MEASUREMENT METHOD AND SYSTEM

BACKGROUND OF THE INVENTION

The present invention relates to a packet communication quality measurement method and system and, more particularly, to a packet communication quality measurement method and system in which probe packets are exchanged between two quality measurement apparatuses connected via a packet communication network, thereby measuring the packet communication quality between these quality measurement apparatuses on the basis of the transmission/reception status.

A conventional packet communication quality measurement method which measures various parameters including the packet delay distribution (delay time), packet loss (loss factor), and throughput (data transfer amount per unit time) as the communication quality of a packet communication network adopts two quality measurement methods: passive and active measurement methods.

According to the passive measurement method, a packet which passes through a desired node or link within a packet communication network is monitored, and the quality of the packet communication network is calculated from the monitoring result (see, e.g., Japanese Patent Laid-Open No. 2001-53792). To obtain a packet delay distribution by the passive measurement method, e.g., temporarily synchronized quality measurement apparatuses are arranged at the two ends of a desired path to be measured. Packets actually transmitted/received by the user via the path, i.e., user packets are captured by the quality measurement apparatuses. Pieces of header information and packet detection times which can specify the user packets are acquired as monitoring data. Two monitoring data obtained by the quality measurement apparatuses are matched with each other. The packet detection time difference of a single user packet is calculated to acquire the packet delay time on the path. The packet delay times of respective user packets are statistically processed to attain a packet delay distribution.

According to the active measurement method, an agent which transmits many probe packets periodically or in accordance with a pseudo user packet generation pattern and an agent which receives the probe packets are arranged within a network, and the network quality between the agents is estimated from the communication qualities of the probe packets (see, e.g., Japanese Patent Laid-Open No. 62-176239). To obtain a packet delay distribution by the active method, e.g., temporarily synchronized quality measurement apparatuses are arranged as the above-mentioned agents at the two ends of a desired path to be measured. A plurality of probe packets are exchanged between the quality measurement apparatuses via the path. The transmission and reception times of each probe packet are acquired as monitoring data. Two monitoring data obtained by the quality measurement apparatuses are matched with each other. The packet transmission/reception time difference of each probe packet is calculated to acquire the delay time on the path. The packet delay times of respective probe packets are statistically processed to attain a packet delay distribution.

These conventional packet communication quality measurement methods suffer the following problems in measuring the quality.

To measure the one-way delay of a packet flowing in a desired direction, in the passive measurement method, many user packets passing through two temporarily synchronized points are compared with each other, as described above. However, the presence of user packets having the same contents causes erroneous packet recognition which decreases the measurement precision, or increases the calculation amount because an enormous amount of data must be processed. For this reason, the passive measurement method is poor in scale extensibility.

To measure the round-trip delay, in the passive measurement method, one-way delays are combined, or a time taken for Ack (Acknowledge) of TCP (Transmission Control Protocol/Internet Protocol) to return is measured. The former method has the same problem as that of one-way delay measurement. In the later method, processing by a server apparatus which performs TCP communication is needed up to the TCP layer, resulting in a large processing delay and low delay precision. Furthermore, measuring the loss factor requires a large calculation amount because pieces of traffic information at a plurality of portions are collated with each other.

According to a method of transmitting a probe packet in accordance with a pseudo user packet generation pattern by the active measurement method, many probe packets flow separately from user packets, applying a load to the packet communication network. At this time, the network load becomes equal to an increase in the number of users, and increases to a non-negligible degree. In a method of transmitting a probe packet at a predetermined interval by the active measurement method, the obtained communication quality is a probe packet communication quality, which is not always a user packet communication quality.

When probe packets are transmitted at a predetermined interval, the traffic of supplying each probe packet is not always constant, and results different from an actual communication quality are observed. For example, the delay amount is measured for several days by transmitting probe packets every other minute to a channel which exhibits no traffic (traffic amount=0) and the delay amount=1 serving as a delay measurement result in the morning, and the traffic amount=1 and the delay amount=100 in the afternoon. In this case, the delay amount=1 is measured by 50% of all probe packets transmitted during this measurement period, the delay amount=100 is measured by the remaining 50% of the probe packets, and the average delay amount is 50.5. On this channel, however, the traffic is generated in the afternoon, and an actual delay amount is 100. Thus, measurement results different from an actual communication quality are observed. This problem cannot be solved even by infinitizing the measurement period.

SUMMARY OF THE INVENTION

The present invention has been made to overcome the conventional drawbacks, and has as its object to provide a packet communication quality measurement method and system which can reduce the network load and calculation amount, obtain high measurement precision, and realize extensibility.

To achieve the above object, according to the present invention, there is provided a packet communication quality measurement method in which two quality measurement devices connected via a packet communication network exchange a probe packet via the packet communication network which connects the quality measurement devices, and a packet communication quality between the quality measurement devices is calculated based on a transmission/reception status of the probe packet, comprising the step of intermittently transmitting probe packets from one quality measurement device to the other quality measurement device via the packet communication network at a predetermined interval, and receiving the probe packets by the other quality measurement device, and the step of calculating a communication quality of each probe packet on the basis of a transmission/reception status of the probe packet exchanged between the two quality measurement devices, weighting the communication quality in accordance with the number of packets flowing in a desired measurement direction along a path which connects the quality measurement devices at an interval between transmission of a previous probe packet and transmission of the probe packet, and calculating a packet communication quality between the quality measurement devices from communication qualities which are calculated and weighted for a plurality of probe packets.

According to the present invention, there is provided another packet communication quality measurement method in which two quality measurement devices connected via a packet communication network exchange a probe packet via the packet communication network which connects the quality measurement devices, and a packet communication quality between the quality measurement devices is calculated based on a transmission/reception status of the probe packet, comprising the step of intermittently transmitting probe packets from one quality measurement device to the other quality measurement device via the packet communication network at an interval corresponding to the number of packets flowing in a desired measurement direction along a path which connects the quality measurement devices, and receiving the probe packets by the other quality measurement device, and the step of calculating a communication quality of each probe packet on the basis of a transmission/reception status of the probe packet exchanged between the two quality measurement devices, and calculating a packet communication quality between the quality measurement devices from communication qualities calculated for a plurality of probe packets.

In the former packet communication quality measurement method, the probe packets may be transmitted at an interval selected in accordance with a predetermined probability distribution instead of the predetermined interval. Alternatively, the probe packets may be transmitted at an interval selected in accordance with a predetermined exponential distribution.

In the latter packet communication quality measurement method, the probe packets may be intermittently transmitted every time a predetermined number of packets flowing through the path are counted. Alternatively, transmission of the probe packets may be stopped at a predetermined probability.

In the two methods, a count obtained by counting only packets which satisfy a predetermined condition out of packets flowing through the path may be used as the number of packets. The predetermined condition may include a condition that a packet has at least a specific transmission or reception address.

Alternatively, a count obtained by counting all packets flowing through the path may be used as the packet count.

The predetermined condition may include a condition that a packet is in temporal proximity to time at which the probe packet is transmitted from one quality measurement device. The predetermined condition may include a condition that a packet is in temporal proximity to time at which the probe packet is detected on the path. The temporal proximity may fall within a range from a predetermined time of not less than 0 before the probe packet transmission time to a predetermined time of not less than 0 after the probe packet transmission time.

As for the communication quality to be measured, the transmission/reception status may contain transmission time and reception time of the probe packet or a time difference between the transmission time and the reception time, and a delay distribution may be calculated as the communication quality between the quality measurement devices on the basis of a measurement delay time of each probe packet obtained from a transmission/reception status of each reception notification.

Alternatively, the transmission/reception status may contain presence/absence of a loss of the probe packet, and a loss factor may be calculated as the communication quality between the quality measurement devices on the basis of presence/absence of losses of probe packets obtained from transmission/reception statuses.

As for the round-trip delay distribution, a count obtained by counting packets flowing in two measurement directions along the path may be used as the number of packets, and a transmission/reception status obtained when a probe packet is transmitted from one quality measurement device to the other quality measurement device, and a corresponding probe packet is sent back to one quality measurement device upon reception of the probe packet from one quality measurement device may be used as the transmission/reception status.

According to the present invention, there is provided a packet communication quality measurement system which has two quality measurement devices connected via a packet communication network, and a management device connected to the quality measurement devices to calculate a packet communication quality between the quality measurement devices, exchanges a probe packet between the quality measurement devices via the packet communication network, and causes the management device to calculate a packet communication quality between the quality measurement devices on the basis of a transmission/reception status of the probe packet, comprising a packet counting device having a packet counting unit which counts packets flowing in a desired measurement direction along a path which connects the quality measurement devices, and a probe packet transmission instructing unit which intermittently designates transmission of probe packets at a predetermined interval, wherein the probe packet transmission instructing unit notifies the management device by a transmission notification that a transmission instruction has been issued and of the number of packets counted by the packet counting unit, one quality measurement device transmits a probe packet to the other quality measurement device via the packet communication network in response to the transmission instruction from the packet counting device, the other quality measurement device notifies the management device by a reception notification of a transmission/reception status of the probe packet received from one quality measurement device, and the management device calculates a communication quality of the probe packet on the basis of the transmission notification from the probe packet transmission instructing unit and the reception notification from the other quality measurement device, weights the calculated communication quality in accordance with the number of packets which is counted between transmission of a previous probe packet and transmission of the probe packet and obtained from the number of packets by the transmission notification, and calculates a packet communication quality between the quality measurement devices from communication qualities which are calculated and weighted for a plurality of probe packets.

According to the present invention, there is provided another packet communication quality measurement system which has two quality measurement devices connected via a packet communication network, and a management device connected to the quality measurement devices to calculate a packet communication quality between the quality measurement devices, exchanges a probe packet between the quality measurement devices via the packet communication network, and causes the management device to calculate a packet communication quality between the quality measurement devices on the basis of a transmission/reception status of the probe packet, comprising a packet counting device having a packet counting unit which counts packets flowing in a desired measurement direction along a path which connects the quality measurement devices, and a probe packet transmission instructing unit which intermittently designates transmission of probe packets at an interval corresponding to the number of packets counted by the packet counting unit, wherein the probe packet transmission instructing unit notifies the management device by a transmission notification of a transmission instruction and that the transmission instruction has been issued, one quality measurement device transmits a probe packet to the other quality measurement device via the packet communication network in response to the transmission instruction from the packet counting device, the other quality measurement device notifies the management device by a reception notification of a transmission/reception status of the probe packet received from one quality measurement device, and the management device calculates a communication quality of the probe packet on the basis of the transmission notification from the probe packet transmission instructing unit and the reception notification from the other quality measurement device, and calculates a packet communication quality between the quality measurement devices from communication qualities calculated for a plurality of probe packets.

In the former packet communication quality measurement system, the probe packet transmission instructing unit may issue the transmission instruction at an interval selected in accordance with a predetermined probability distribution instead of the predetermined interval. Alternatively, the probe packet transmission instructing unit may issue the transmission instruction at an interval selected in accordance with a predetermined exponential distribution instead of the predetermined interval.

In the latter packet communication quality measurement system, as for the interval of the transmission instruction, the probe packet transmission instructing unit may intermittently issue the transmission instruction every time the packet counting unit counts a predetermined number of packets. Alternatively, the transmission instruction may be stopped at a predetermined probability.

In the two systems, as for packets to be counted, the packet counting unit may count only packets which satisfy a predetermined condition out of packets flowing through the path. For example, the predetermined condition may include a condition that a packet has at least a specific transmission or reception address. Alternatively, all packets flowing through the path may be counted.

The predetermined condition may include a condition that a packet is in temporal proximity to probe packet transmission time represented by the probe packet transmission instructing unit to one quality measurement device. Alternatively, the predetermined condition may include a condition that a packet is in temporal proximity to time at which the packet counting unit detects the probe packet. The temporal proximity may fall within a range from a predetermined time of not less than 0 before the time to a predetermined time of not less than 0 after the time.

As for the communication quality to be measured, the transmission/reception status may contain transmission time and reception time of the probe packet or a time difference between the transmission time and the reception time, and the management device may calculate a delay distribution as the communication quality between the quality measurement devices on the basis of a measurement delay time of each probe packet obtained from a transmission/reception status of each reception notification.

Alternatively, the transmission/reception status may contain presence/absence of a loss of the probe packet, and the management device may calculate a loss factor as the communication quality between the quality measurement devices on the basis of presence/absence of losses of probe packets obtained from transmission/reception statuses.

As for identification of the probe packet, the probe packet transmission instructing unit may add, to a transmission instruction, identification information for identifying the transmission instruction, thereby transmitting the transmission instruction, and may add the identification information to a transmission notification, thereby notifying the management device of the transmission notification, one quality measurement device may transmit in a probe packet the identification information added to the transmission instruction, and the other quality measurement device may add the identification information contained in the probe packet, and notify the management device of the reception notification, and the management device may identify that the notifications concern the same probe packet on the basis of the identification information added to the transmission notification and the identification information added to the reception notification.

At this time, as for determination of the loss of the probe packet, the management device may determine that a probe packet corresponding to the identification information has been lost when the management device does not receive any reception notification containing the same identification information as the identification information added to the transmission notification before the lapse of a predetermined time after reception of the transmission notification.

As for the round-trip delay distribution, the packet counting unit may count packets flowing in two measurement directions along the path, one quality measurement device may notify the management device by a reception notification of transmission of probe packets to the other quality measurement device and in addition a transmission/reception status of the probe packets upon reception of probe packets which correspond to the probe packets and are sent back from the other quality measurement device, and the other quality measurement device may send back, instead of the reception notification to the management device, corresponding probe packets to one quality measurement device upon reception of the probe packets from one quality measurement device.

BRIEF DESCRIPTION OF THE DRAWINGS

FIG. 2 is a block diagram showing the arrangement of a packet communication quality measurement system according to the first embodiment of the present invention;

DESCRIPTION OF THE PREFERRED EMBODIMENTS

Preferred embodiments of the present invention will be described below with reference to the accompanying drawings.

Figure 1:
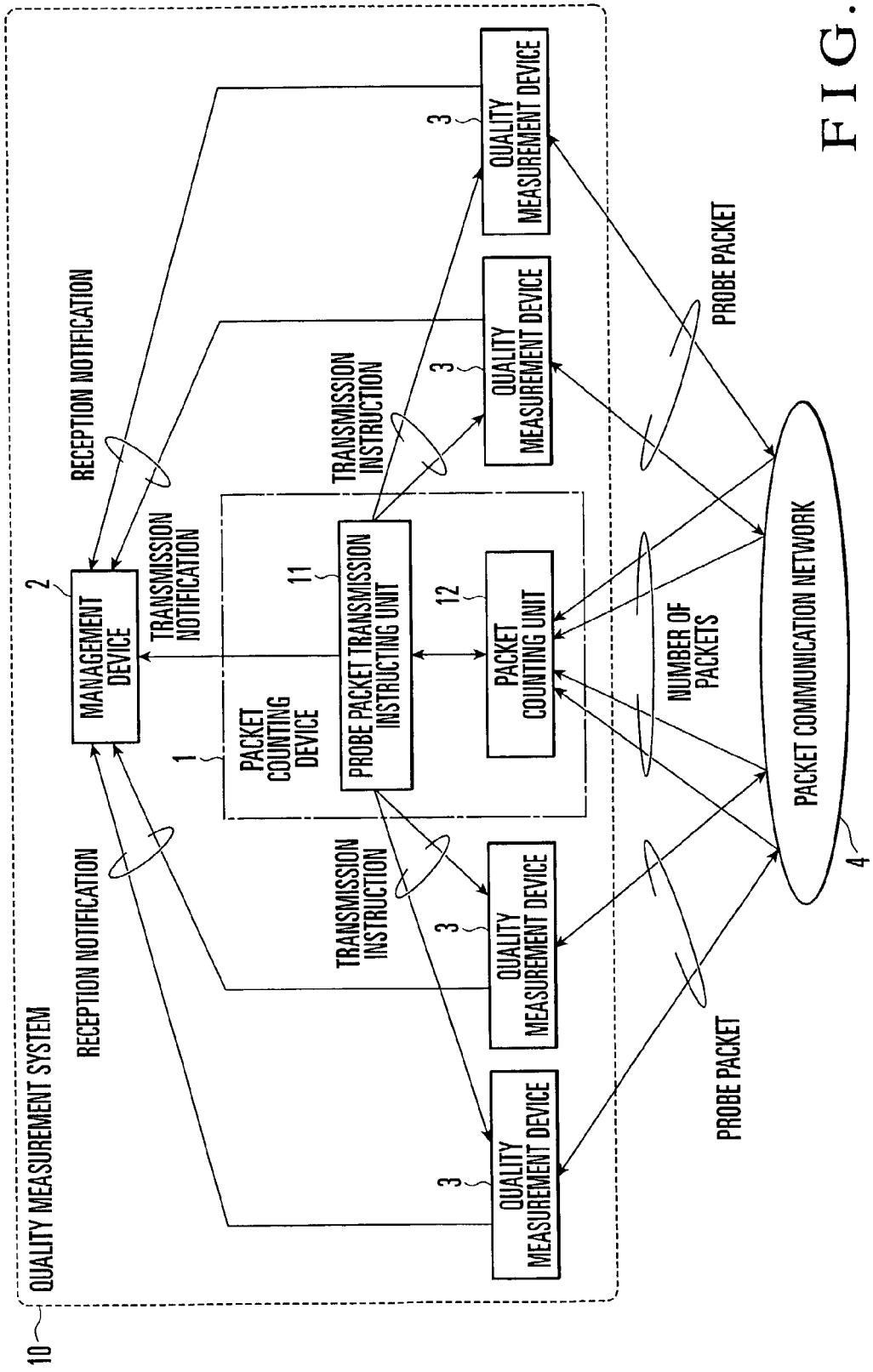
FIG. 1 is a block diagram showing the basic arrangement of a packet communication quality measurement system according to the present invention.

FIG. 1 shows the arrangement of a packet communication quality measurement system according to an embodiment of the present invention.

A packet communication quality measurement system 10 comprises a packet counting device 1, a management device 2, and a plurality of quality measurement devices 3. Each quality measurement device 3 is connected to a packet communication network 4 to be measured.

In the following description, the packet communication network 4 will be described by exemplifying a simple topology made up of an IP (Internet Protocol) router, an IP terminal, and a link which links them.

The packet counting device 1 and management device 2, the packet counting device 1 and each quality measurement device 3, and the management device 2 and each quality measurement device 3 are connected via predetermined communication networks. These devices exchange various pieces of information necessary to measure the packet communication quality.

The packet counting device 1 is a communication device having a packet counting unit 12 which counts packets flowing between quality measurement devices 3 to be measured in the packet communication network 4, and a probe packet transmission instructing unit 11 which intermittently instructs the quality measurement devices 3 to be measured to transmit probe packets.

The quality measurement device 3 is a communication device (IP terminal) which transmits, based on a transmission instruction from the probe packet transmission instructing unit 11 of the packet counting device 1, a predetermined probe packet via the packet communication network 4 to the other quality measurement device 3 paired with this quality measurement device 3.

The management device 2 is a processing device which calculates the communication quality of a probe packet on the basis of the transmission/reception status of the probe packet exchanged between two quality measurement devices 3, and calculates (estimates) the communication quality between the quality measurement devices by using the communication quality of each probe packet.

As the packet counting device 1, quality measurement device 3, and management device 2, dedicated measurement devices may be used, or a personal computer and server apparatus having a packet communication function may be used.

A probe packet is assigned an identifier representing that this packet is a probe packet. With the identifier, the probe packet is detected distinctively of another user packet. As the identifier representing a probe packet, a specific value is written in a free field within the packet header, or a specific value is written at a specific position in a packet payload.

The present invention constitutes the packet communication quality measurement system in this manner. The packet counting device 1 actually counts packets flowing through a path which connects desired quality measurement devices, thereby grasping the traffic amount of the path. Individual communication qualities are obtained from respective probe packets in consideration of the traffic amount, in this case, the packet count. The management device 2 calculates the communication quality between desired quality measurement devices 3 from these communication qualities.

The packet communication quality measurement system according to the present invention will be exemplified.

Figure 3:
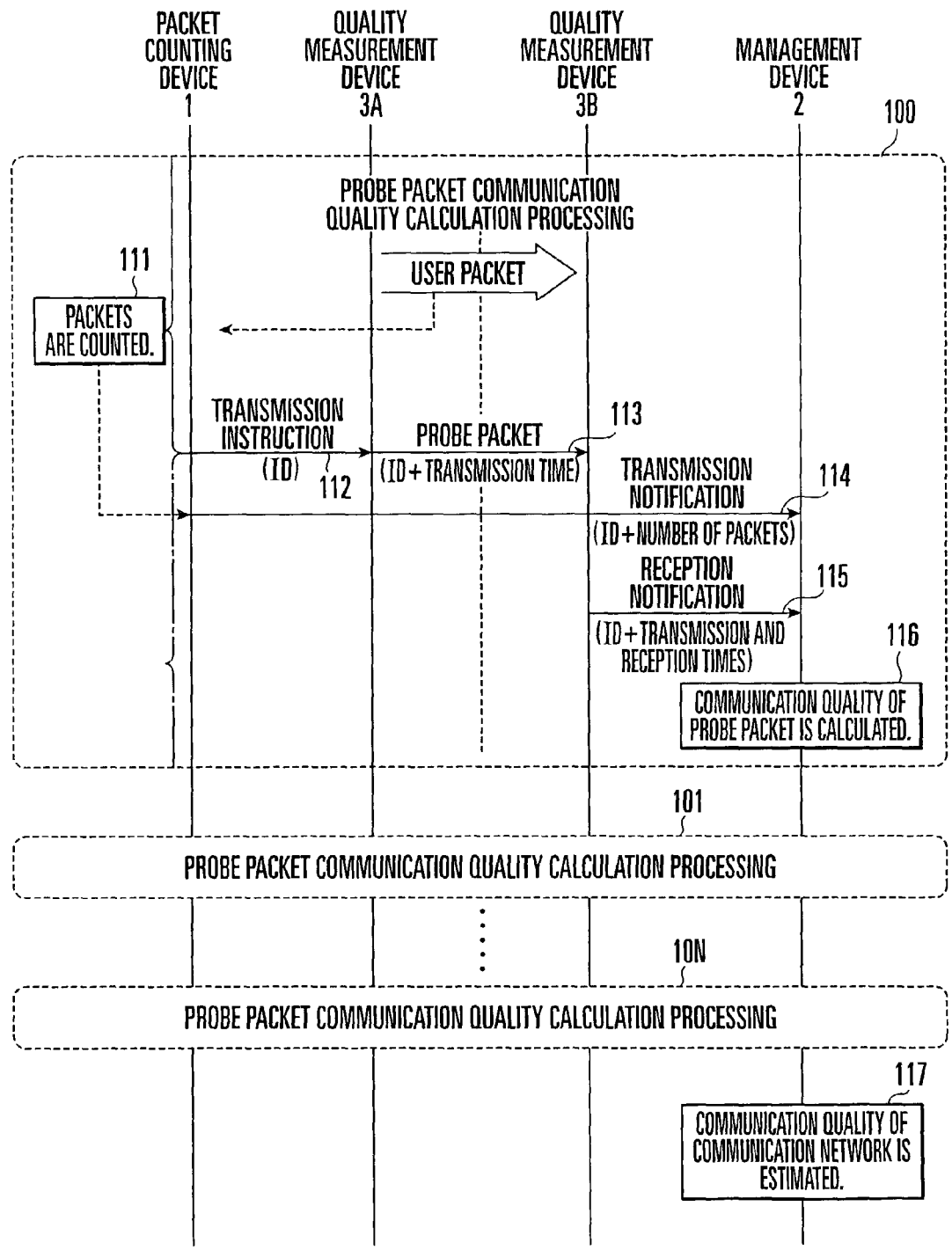
FIG. 3 is a sequence view showing quality measurement operation of the packet communication quality measurement system according to the first embodiment of the present invention.

A packet communication quality measurement system according to the first embodiment of the present invention will be explained with reference to FIGS. 2 and 3. FIG. 2 shows an arrangement of the packet communication quality measurement system according to the first embodiment. FIG. 3 shows quality measurement operation sequence of the packet communication quality measurement system according to the first embodiment.

In the first embodiment, a management device 2 is notified of a packet count obtained by measuring probe packets by a packet counting device 1. Communication qualities obtained from respective probe packets are weighted based on the packet count. The communication quality between desired quality measurement devices is calculated from obtained communication qualities.

In FIG. 2, quality measurement devices 3A and 3B are used to measure the communication quality. The quality measurement device 3A which transmits a probe packet is connected to the packet counting device 1. The quality measurement device 3B which receives a probe packet is connected to the management device 2.

A packet communication network 4 which connects the quality measurement devices 3A and 3B is comprised of a plurality of IP routers 5A to 5C, and links 4A to 4C which link the IP routers.

The IP router 5A is connected to the quality measurement device 3A; and the IP router 5B, to the quality measurement device 3B. The IP routers 5A to 5C are respectively connected to IP terminals 6. The IP routers 5A and 5B are connected via a link, i.e., link 4A to be measured. The IP routers 5A and 5C, and the IP routers 5B and 5C are respectively connected via the links 4B and 4C.

The first embodiment measures the packet communication quality in a direction from the quality measurement device 3A to the quality measurement device 3B connected via the IP routers 5A and 5B and link 4A to be measured, i.e., the one-way delay distribution and loss factor. The first embodiment is not limited to this example, and can similarly measure the packet communication quality for another link or direction.

In order to measure the measurement delay time from probe packet transmission and reception times, at least the quality measurement devices 3A and 3B are temporarily synchronized with each other by using information from, e.g., a GPS.

Connection between the quality measurement device 3A and the IP router 5A and connection between the quality measurement device 3B and the IP router 5B adopt links which directly link them via an Ethernet® at small-noise locations so as to ignore quality degradation.

As shown in FIG. 3, when the communication quality is to be measured, a packet counting unit 12 of the packet counting device 1 starts counting all packets in a direction from the IP router 5A to the IP router 5B out of packets flowing through the link (path) 4A in accordance with the start of measurement (step 111).

This can be realized by, e.g., connecting a physical layer branch unit (not shown) to the link 4A and transmitting all packets having passed through the branch device to the packet counting unit 12. Probe packets transmitted from the quality measurement device 3A are not counted, and other user packets are measured.

A predetermined interval after the start of counting packets, a probe packet transmission instructing unit 11 of the packet counting device 1 notifies the quality measurement device 3A of a transmission instruction which designates transmission of a probe packet (step 112). This transmission instruction is assigned unique identification information (ID) for identifying each transmission instruction.

Immediately after receiving the transmission instruction from the packet counting device 1, the quality measurement device 3A transmits a probe packet to the quality measurement device 3B (step 113). The probe packet is formed from an IP packet where identification information assigned to the transmission instruction and the transmission time of the probe packet are described.

At almost the same time as notification of the transmission instruction, i.e., transmission of the probe packet, the packet counting unit 12 of the probe packet counting device 1 ends packet counting which has started in step 111. The packet counting unit 12 notifies the management device 2 by a transmission notification of the identification information assigned to the transmission instruction notified in step 112, and the number of packets (cumulative number) counted by the packet counting unit 12 up to this point (step 114).

To continue probe packet counting until the next transmission instruction is issued starts immediately after the end of packet counting.

The probe packet from the quality measurement device 3A arrives at the quality measurement device 3B via the IP router 5A, link 4A, and IP router 5B. The quality measurement device 3B receives the probe packet from the quality measurement device 3A, and notifies the management device 2 by a reception notification of the transmission time and identification information described in the probe packet and the reception time at which the probe packet has been received (step 115). The reception notification can also notify the management device 2 that the probe packet has arrived (arrival).

The management device 2 calculates the time taken to transfer the probe packet from the quality measurement device 3A to the quality measurement device 3B, i.e., the one-way delay time on the basis of the time difference between the transmission and reception times of the probe packet contained in the reception notification received from the quality measurement device 3B (step 116).

The management device 2 calculates the loss factor such that, if the management device 2 is not notified of the reception notification of a probe packet having identification information notified by a transmission notification before the lapse of a predetermined time after the transmission notification received from the packet counting device 1, the management device 2 determines that the probe packet has been lost, and sets the loss factor=1; otherwise, sets the loss factor=0 (step 116).

In this manner, probe packet communication quality calculation processing from steps 111 to 116 is performed for one probe packet (step 100). This processing is repetitively executed a plurality of number of times (N times) every transmission instruction, i.e., probe packet transmitted intermittently at a predetermined interval from the packet counting device 1 to the quality measurement device 3A (steps 101 to 10N).

The management device 2 subtracts the previously received packet count from a packet count (cumulative value) received by a transmission notification from the packet counting device 1, and calculates the number of packets between two transmission notifications, i.e., two probe packets.

The management device 2 weights the delay distribution and loss factor of the probe packet in accordance with the number of packets. From the previously obtained communication quality, in this case, the one-way delay time and loss factor, the management device 2 attains the communication quality, i.e., the one-way delay distribution and loss factor between the quality measurement devices 3A and 3B (step 117).

Let w(i) be the weight for the ith (i is a positive integer) probe packet, and the W(i)=w(1)+ . . . +w(i) be the sum of weights for up to the ith probe packet. As the weight w(i), the number of corresponding packets may be directly used.

Letting d(i) be the ith measurement delay time, a delay distribution function Fi(x) representing a ratio at which the measurement delay is x or less after i measurements is given by equation (1). In an initial state, F0(x)=0 for all x.

$$Fi(x) = \frac{W(i-1)}{W(i)} \cdot F(i-1)(x) + \frac{w(i)}{W(i)} \cdot S(d(i), x) \quad (1)$$

where S(a,x)=0 (at x<a), S(a,x)=1 (at x≧a)

Letting p(i) (=0 or 1) be the loss factor of the ith probe packet, a loss factor L(i) (∈[0,1]) after i measurements is given by equation (2). In an initial state, L(0)=0.

$$L(i) = \frac{W(i-1)}{W(i)} \cdot L(i-1) + \frac{w(i)}{W(i)} \cdot p(i) \quad (2)$$

The delay distribution function Fi(x) and loss factor L(i) can also be obtained from equations (3) and (4) by using the weights w(1) to w(i), the measurement delay times d(1) to d(i), and the loss factors p(1) to p(i) concerning previous probe packets.

$$Fi(x) = \frac{w(1)}{W(i)} \cdot S(d(1), x) + \frac{w(2)}{W(i)} \cdot S(d(2), x) + \ldots + \frac{w(i)}{W(i)} \cdot S(d(i), x) \quad (3)$$

where S(a,x)=0 (at x<a), S(a,x)=1 (at x≧a)

$$L(i) = \frac{w(1)}{W(i)} \cdot p(1) + \frac{w(2)}{W(i)} \cdot p(2) + \ldots + \frac{w(i)}{W(i)} \cdot p(i) \quad (4)$$

In the first embodiment, probe packets are intermittently transmitted from the quality measurement device 3A at a predetermined interval, and received by the quality measurement device 3B. The management device 2 calculates the communication quality of each probe packet on the basis of the transmission/reception status of the probe packet exchanged between the quality measurement devices 3A and 3B. The management device 2 weights the communication quality in accordance with the number of packets flowing in a desired measurement direction along a path which connects the quality measurement devices 3A and 3B at an interval between transmission of a previous probe packet and transmission of the current probe packet. The management device 2 calculates the packet communication quality between the quality measurement devices 3A and 3B from communication qualities which are calculated and weighted for a plurality of probe packets.

This means that measure transformation of an active measurement result is performed using passive measurement information. The passive measurement calculation amount and active measurement frequency can be decreased, whereas the precision can be increased.

More specifically, the first embodiment does not use any user packet for measurement of the packet communication quality, and thus can avoid various problems caused by the use of many user packets, unlike the above-described passive measurement method. For example, in one-way delay measurement and loss factor measurement by the passive measurement method, monitoring data must be collected at one portion in order to match the monitoring data measured from many user packets at different points. In addition, the identification information size for identifying many user packets must be large, resulting in an enormous transfer data amount. To the contrary, the present invention suffices to match only monitoring data concerning intermittently transmitted probe packets. Identification information suffices to have a size enough to identify probe packets, thus greatly reducing the transfer data amount.

The communication quality obtained from each probe packet is weighted in accordance with the number of packets actually flowing through a path which connects the quality measurement devices 3A and 3B. The first embodiment can, therefore, correct the communication quality difference corresponding to variations in traffic amount caused when probe packets are intermittently transmitted at a predetermined interval. The load of probe packets on the packet communication network can be reduced in comparison with the method of transmitting probe packets in accordance with a pseudo user packet generation pattern by the active measurement method described above. The first embodiment does not require any pseudo user packet generation pattern, and can cope with an application or user whose user packet generation pattern is unknown. Accordingly, the first embodiment can implement a packet communication quality measurement system which can reduce the network load and calculation amount, obtain high measurement precision, and realize extensibility.

In the first embodiment, the probe packet transmission instructing unit 11 of the packet counting device 1 notifies the quality measurement device 3A of a transmission instruction at a predetermined interval. Instead, the probe packet transmission instructing unit 11 may notify the quality measurement device 3A of a transmission instruction in a cycle selected in accordance with a predetermined probability distribution.

In this case, probe packets are transmitted not at a predetermined interval but an irregular interval. Even if the traffic pattern between the quality measurement devices 3A and 3B contains an arbitrary frequency component, synchronization between variations and measurements can be suppressed to measure the quality at high precision. An example of the probability distribution is an exponential distribution. The exponential distribution has a Markov characteristic (memorylessness), and enables reliably avoiding synchronization between traffic variations and measurements.

In the first embodiment, the packet counting unit 12 may accumulate and count packets when the probe packet transmission instructing unit 11 notifies the management device 2 of a packet count by a transmission notification. In this case, the packet counting unit 12 notifies the management device 2 of the cumulative number at the transmission instruction notification timing. Then, the management device 2 calculates a packet count corresponding to a probe packet on the basis of the difference from the previously notified cumulative number.

Alternatively, the packet counting unit 12 may start new counting every transmission instruction notification, and notify the management device 2 of a count at the transmission instruction notification timing.

In the first embodiment, individual identification information is assigned every transmission instruction, and added to a probe packet to transmit the identification information. This allows easily identifying that measurement targets the same probe packet. In particular, when the packet count is notified by a transmission notification to the management device 2, identification information is added to easily make the packet count and the transmission/reception status of a notified probe packet correspond to each other.

The presence/absence of the probe packet loss is determined from whether the reception notification of a probe packet having the same identification information as the identification information has been issued before the lapse of a predetermined period after a transmission notification. Thus, the probe packet loss can be easily, accurately determined.

In the first embodiment, a probability filtering unit may be arranged in the packet counting device 1 to cancel transmission instructions from the probe packet transmission instructing unit 11 at a predetermined probability.

This arrangement can reduce the measurement error generated when the measurement cycle synchronizes with periodic variations in the traffic of a path which connects quality measurement device.

Figure 6:
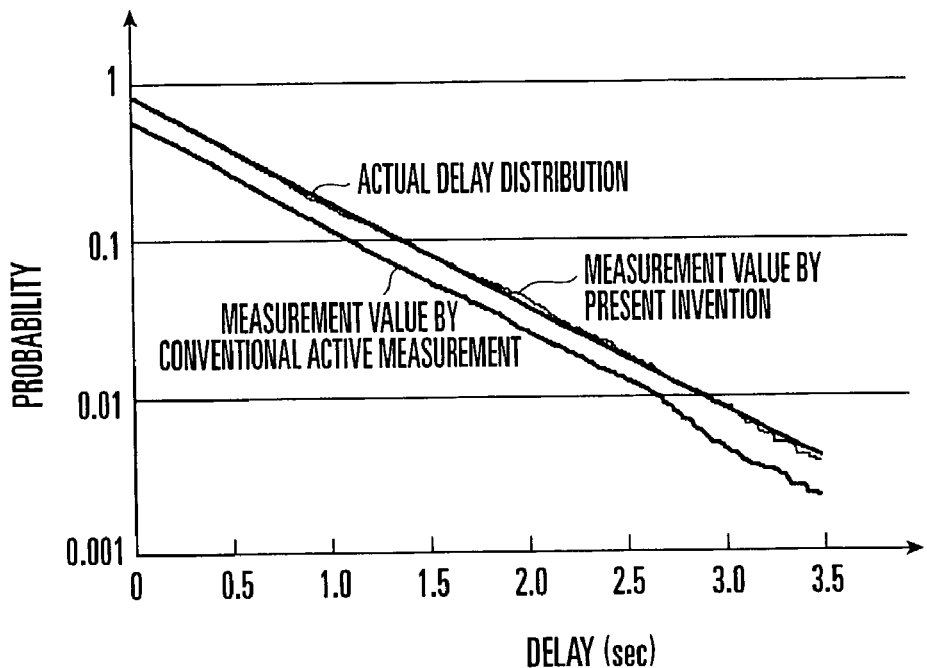
FIG. 6 is a graph showing the measurement precision of the packet communication quality measurement system according to the present invention.

FIG. 6 shows a delay distribution when a packet source which generates packets in accordance with IPP (discrete Markov process) is multiplexed by 10 as a result of measuring the communication quality according to the first embodiment. In this graph, the abscissa represents a measurement delay time x, and the ordinate represents a probability 1–Fi(x). The delay distribution function Fi(x) exhibits a ratio at which the measurement delay is x or less after i measurements.

As is apparent from this graph, when the delay distribution characteristic is measured by transmitting many probe packets by the conventional active measurement method, i.e., periodically, the delay distribution characteristic deviates from an actual one under the influence of the traffic status of transmitting/receiving a probe packet. In contrast, the delay distribution of the present invention is corrected by weighting and almost coincides with an actual delay distribution characteristic, thereby realizing high-precision communication quality measurement.

A packet communication quality measurement system according to the second embodiment of the present invention will be described.

In the first embodiment, the management device 2 executes weighting corresponding to a packet count in consideration of the influence of traffic variations on probe packets transmitted at a predetermined interval. In the second embodiment, probe packets are transmitted at an interval corresponding to a traffic amount, in this case, a packet count so as to suppress the influence of traffic variations on probe packets. The packet communication quality measurement system has the same arrangement as that of the first embodiment (see FIG. 2). The second embodiment will exemplify measurement of the quality between quality measurement devices 3A and 3B, similar to the first embodiment.

In this case, a probe packet transmission instructing unit 11 of a packet counting device 1 notifies the quality measurement device 3A of a transmission instruction for a new probe packet when the packet count on a link 4A that is counted by a packet counting unit 12 after transmission of a previous probe packet reaches a predetermined number.

As a transmission notification, the probe packet transmission instructing unit 11 need not notify a management device 2 of the packet count but notifies it of only identification information.

After that, probe packets are exchanged between the quality measurement devices 3A and 3B. The quality measurement device 3B notifies the management device 2 of reception notifications in the above-described manner. The management device 2 calculates the communication qualities of respective probe packets, and calculates the communication quality between the quality measurement devices 3A and 3B from these communication qualities.

In calculating the communication quality, the management device 2 need not perform weighting, unlike the first embodiment.

Letting d(i) be the ith measurement delay time, the delay distribution function Fi(x) representing a ratio at which the measurement delay is x or less after i measurements is given by equation (5). In an initial state, F0(x)=0 for all x.

$$Fi(x) = \frac{i-1}{i} \cdot F(i-1)(x) + \frac{1}{i} \cdot S(d(i), x) \quad (5)$$

where S(a,x)=0 (at x<a), S(a,x)=1 (at x≧a)

Letting p(i) (=0 or 1) be the loss factor of the ith probe packet, the loss factor L(i) (∈[0,1]) after i measurements is given by equation (6). In an initial state, L(0)=0.

$$L(i) = \frac{i-1}{i} \cdot L(i-1) + \frac{1}{i} \cdot p(i) \quad (6)$$

The delay distribution function Fi(x) and loss factor L(i) may also be obtained from equations (7) and (8) by using the measurement delay times d(1) to d(i), and the loss factors p(1) to p(i) concerning previous probe packets.

$$Fi(x) = \frac{1}{i} \cdot S(d(1), x) + \frac{1}{i} \cdot S(d(2), x) + \ldots + \frac{1}{i} \cdot S(d(i), x) \quad (7)$$

where S(a,x)=0 (at x<a), S(a,x)=1 (at x≧a)

$$L(i) = \frac{1}{i} \cdot p(1) + \frac{1}{i} \cdot p(2) + \ldots + \frac{1}{i} \cdot p(i) \quad (8)$$

In the second embodiment, probe packets are intermittently transmitted from the quality measurement device 3A and received by the quality measurement device 3B at an interval corresponding to the number of packets flowing in a desired measurement direction along a path which connects the quality measurement devices 3A and 3B. The communication quality of each probe packet is calculated on the basis of the transmission/reception status of the probe packet exchanged between the quality measurement devices 3A and 3B. The packet communication quality between the quality measurement devices 3A and 3B is calculated from communication qualities calculated for a plurality of probe packets.

This means that an active measurement interval is set using passive measurement information. The passive measurement calculation amount and active measurement frequency can be decreased, and the precision can be increased.

The second embodiment can therefore obtain the same operation effects as those of the first embodiment. Compared to the first embodiment, the second embodiment can eliminate weighting processing from the management device 2 without excessively increasing the processing load on the packet counting unit 12.

The second embodiment may adopt the following method of determining a timing at which a transmission instruction is notified. That is, the packet counting unit 12 accumulates and counts packets, and when the cumulative number reaches a threshold set by adding a predetermined number to a cumulative number used for a previous transmission instruction, a new transmission instruction is sent. Alternatively, the packet counting unit 12 may start new counting every notification of a transmission instruction, and when the count reaches a predetermined number, a new transmission instruction may be sent.

In the second embodiment, a probability filtering unit may be arranged in the packet counting device 1 to cancel transmission instructions from the probe packet transmission instructing unit 11 at a predetermined probability. This arrangement can reduce the measurement error generated when the measurement cycle synchronizes with periodic variations in the traffic of a path which connects quality measurement devices.

A packet communication quality measurement system according to the third embodiment of the present invention will be described.

In the first and second embodiments described above, the packet counting unit 12 of the packet counting device 1 counts all packets flowing through a path which connects the quality measurement devices 3A and 3B. In these embodiments, only packets which satisfy a specific condition may be counted.

As an example of the condition, only packets whose transmission or reception addresses, or transmission and reception addresses coincide with desired addresses may be counted. The packet communication quality concerning a desired user or user group can be measured.

Similarly, the following condition may be used: packets in which the TOS (Type Of Service) field values of IP packets take a desired value, packets whose packet lengths fall within a predetermined range, packets in which the port numbers of TCP packets fall within a predetermined range, packets in which the port numbers of UDP (User Datagram Protocol) packets fall within a predetermined range, or packets in which pieces of information at specific positions fall within a predetermined range.

The method of transmitting probe packets at a predetermined interval by the conventional active measurement method cannot individually measure the quality for a specific application or user. The present invention can measure the packet communication quality for a desired user or application by using the above conditions singly or in combination with each other.

Figure 7:
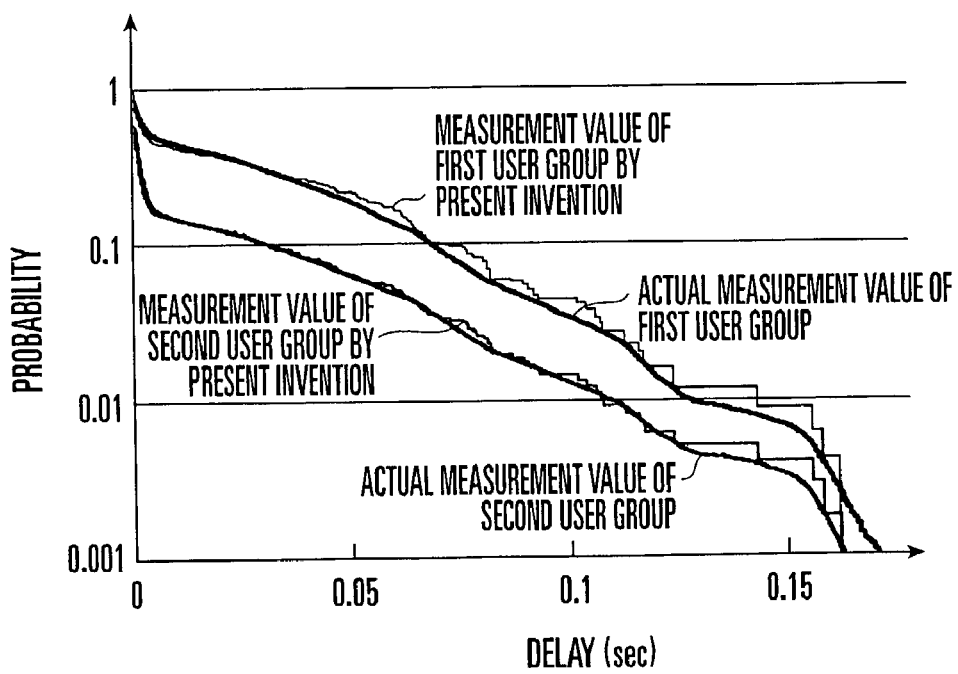
FIG. 7 is a graph showing another measurement precision of the packet communication quality measurement system according to the present invention.

FIG. 7 shows the TCP traffic delay distributions of two user groups having different traffic patterns as a result of measuring the communication quality by the third embodiment. In this graph, the abscissa represents a measurement delay time x, and the ordinate represents a probability $1-Fi(x)$. The delay distribution function $Fi(x)$ exhibits a ratio at which the measurement delay is x or less after i measurements.

As is apparent from this graph, even when a plurality of user groups are multiplexed, almost the same measurement values as the actual measurement values of the respective user groups can be individually obtained because only packets which satisfy a predetermined condition, in this case, packets belonging to the first and second user groups are separately counted.

Figure 4:
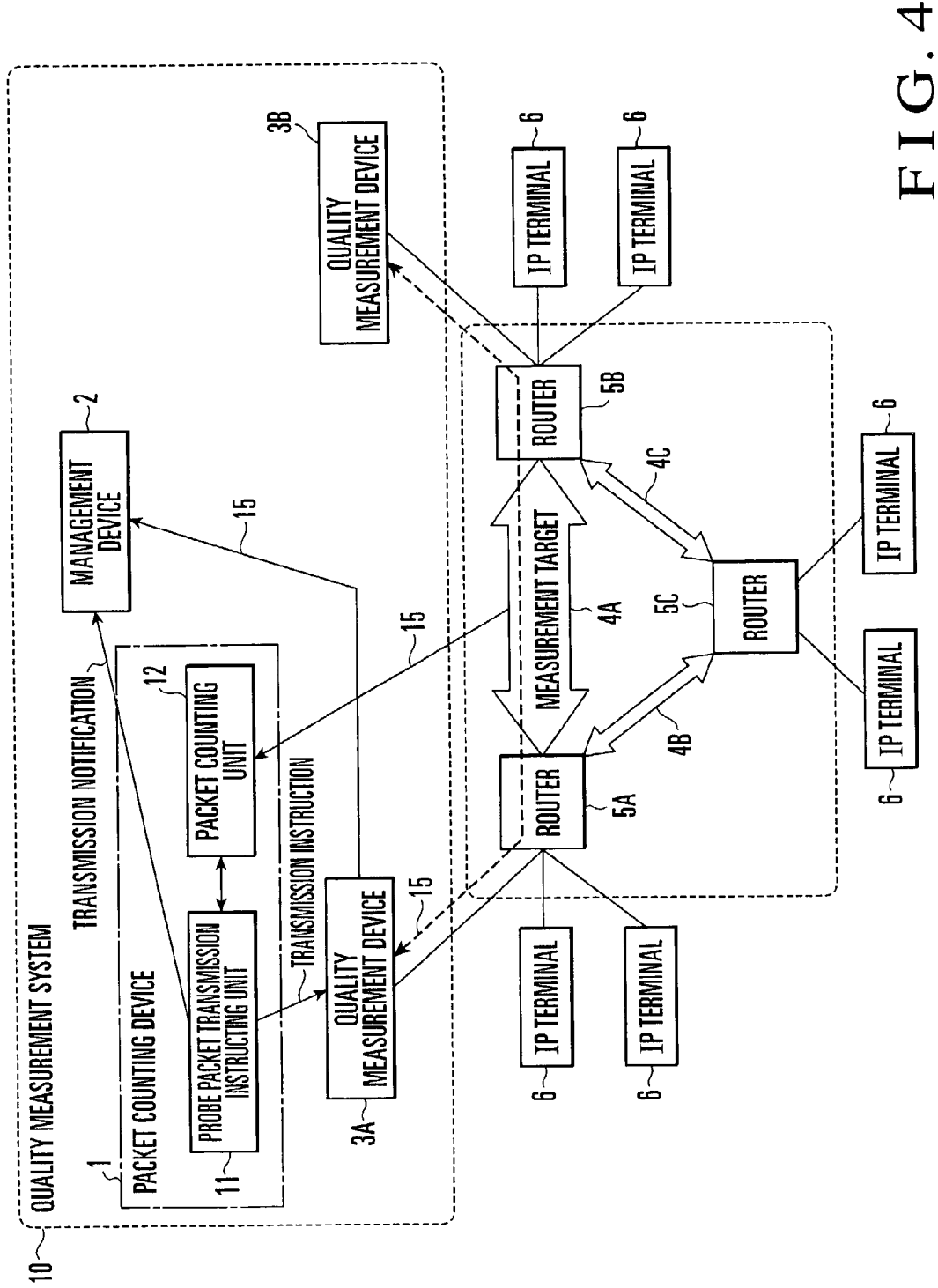
FIG. 4 is a block diagram showing the arrangement of a packet communication quality measurement system according to the fourth embodiment of the present invention.
Figure 5:
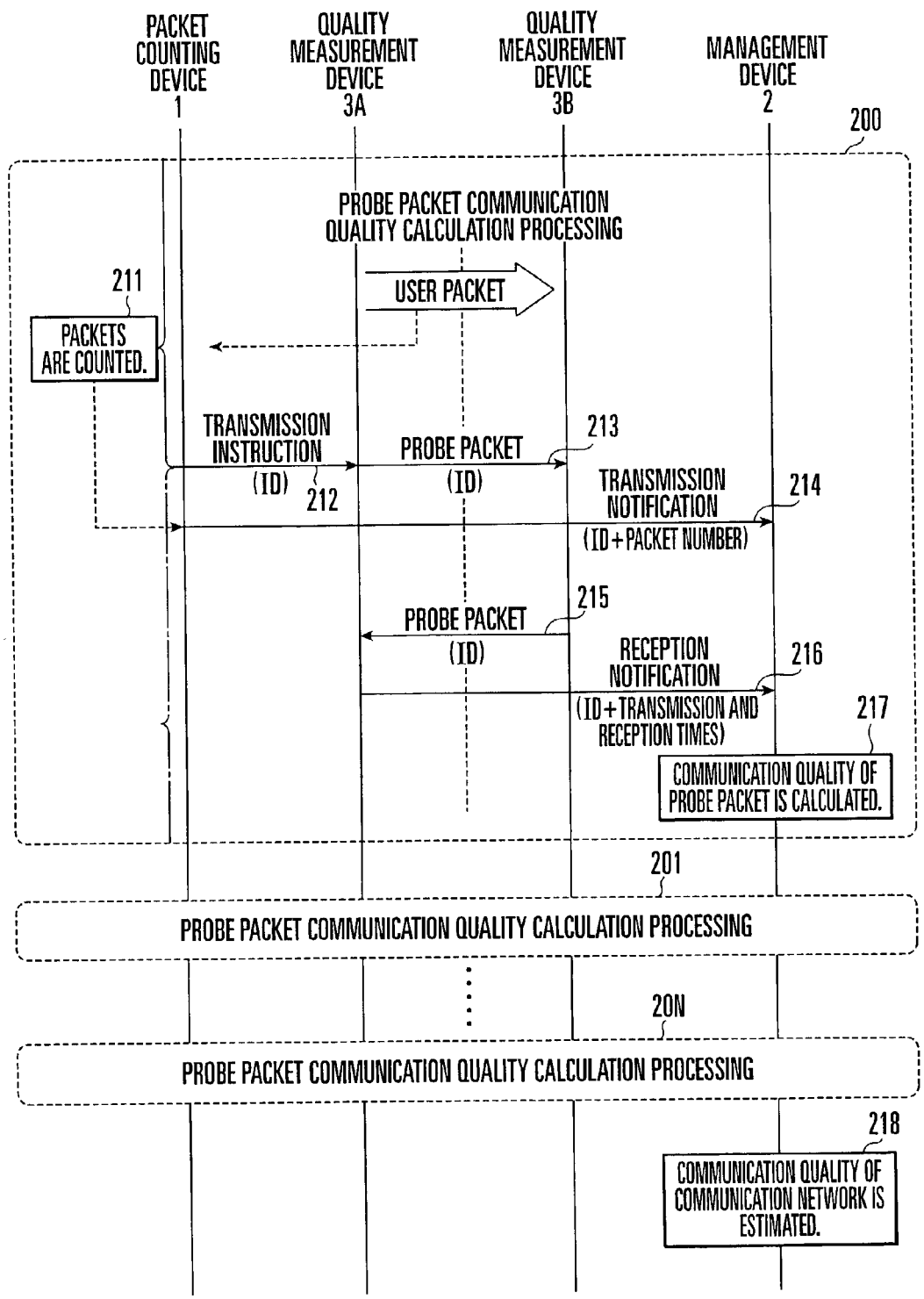
FIG. 5 is a sequence view showing quality measurement operation of the packet communication quality measurement system according to the fourth embodiment of the present invention.

A packet communication quality measurement system according to the fourth embodiment of the present invention will be described with reference to FIGS. 4 and 5. FIG. 4 shows an arrangement of the packet communication quality measurement system according to the fourth embodiment. FIG. 5 shows quality measurement operation sequence of the packet communication quality measurement system according to the fourth embodiment.

In the above-described first to third embodiments, the communication quality (one-way delay distribution) of a packet flowing from the quality measurement device 3A to the quality measurement device 3B is measured. In these embodiments, the communication quality (round-trip delay distribution) of a packet which reciprocates between the quality measurement devices 3A and 3B may be measured regardless of the packet direction.

In this case, the operation (steps 211, 212, and 214) of a packet counting device 1 are the same as the first embodiment (FIG. 3: steps 111, 112, and 114). In transmitting a probe packet in response to a transmission instruction, a quality measurement device 3A transmits a probe packet without adding any transmission time to it (step 213), and stores the transmission time in correspondence with identification information.

If a quality measurement device 3B receives the probe packet from the quality measurement device 3A, the device 3B sends back another probe packet having the same identification information to the quality measurement device 3A (step 215).

Upon reception of the sent-back probe packet, the quality measurement device 3A notifies a management device 2 of, as a reception notification, the transmission time stored together with identification information of the probe packet, the reception time of the probe packet, and the identification information (step 216). Similar to the first embodiment (FIG. 1: see step 116), the management device 2 calculates the communication quality of the probe packet (step 217).

The management device 2 repetitively calculates the communication qualities of respective probe packets (steps 200 to 20N). Similar to the first embodiment (FIG. 1: see step 117), the management device 2 calculates the communication quality between the quality measurement devices 3A and 3B from a plurality of communication qualities (step 218).

A packet counting unit 12 counts packets flowing in two measurement directions along a path which connects the quality measurement devices 3A and 3B. Upon reception of a probe packet from the quality measurement device 3A, the quality measurement device 3B sends back a corresponding probe packet. Upon reception of the sent-back probe packet corresponding to the probe packet, the quality measurement device 3A notifies the management device by a reception notification of the transmission/reception status of the probe packet. The round-trip delay distribution can be easily measured, obtaining the same operation effects as those of the first embodiment.

A packet communication quality measurement system according to the fifth embodiment of the present invention will be described.

In the first to fourth embodiments, the packet counting unit 12 of the packet counting device 1 counts, of packets flowing through a path which connects the quality measurement devices 3A and 3B, all the packets or only packets whose contents satisfy a specific condition, and issues a transmission notification every probe packet. In these embodiments, the packet counting unit 12 may count only packets in temporal proximity to probe packet transmission time (packet counting time width). Also, the packet counting unit 12 may issue a transmission notification for a plurality of probe packets.

As an example of the temporal proximity, the packet counting unit 12 counts only packets up to probe packet transmission time a predetermined time before transmission of a probe packet, packets a predetermined time after probe packet transmission time, or packets from a predetermined time before transmission of a probe packet to a predetermined time after the transmission.

With this setting, the network load of probe packets can be further reduced. If the probe packet interval is widened in weighting using the number of packets between probe packets, a temporarily distant packet influences the weight of a probe packet, decreasing the precision. To the contrary, even if the probe packet interval is widened in weighting using the number of temporary proximity packets, only temporary proximity packets influence the weight of a probe packet, allowing widening the probe packet interval.

As an example of probe packets, all probe packets transmitted in a period during which the quality is to be measured can be adopted. The load of connecting/disconnecting communication between devices can be reduced.

Figure 9:
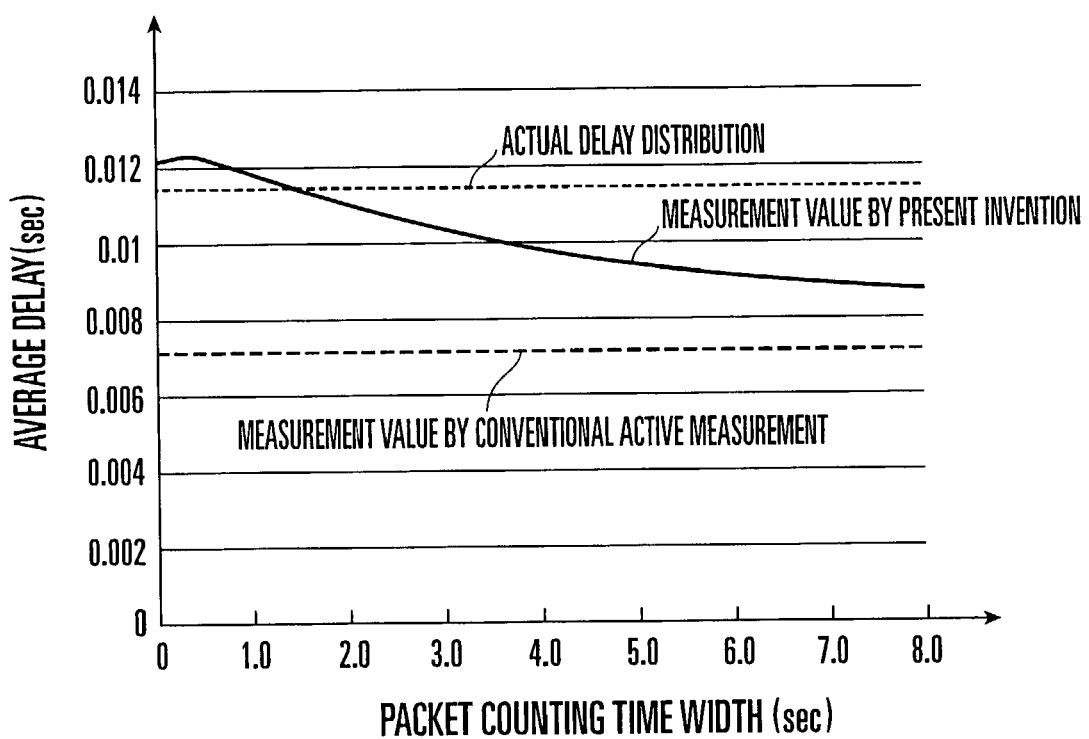
FIG. 9 is a graph showing the effects of weighting using the number of temporary proximity packets.

FIG. 9 shows the effects of weighting using the number of temporary proximity packets.

The ordinate represents the measurement result of the average delay, and the abscissa represents the packet counting time width. The probe packet interval is 8 sec. Thus, the packet counting time width=8 sec point corresponds to weighting using the number of packets between probe packets. As the packet counting time width=8 sec point becomes shorter, the precision in the present invention becomes higher. The error is almost 0 around 1 sec. FIG. 9 also reveals that the present invention maintains higher precision across the entire region than the conventional active measurement.

Figure 8:
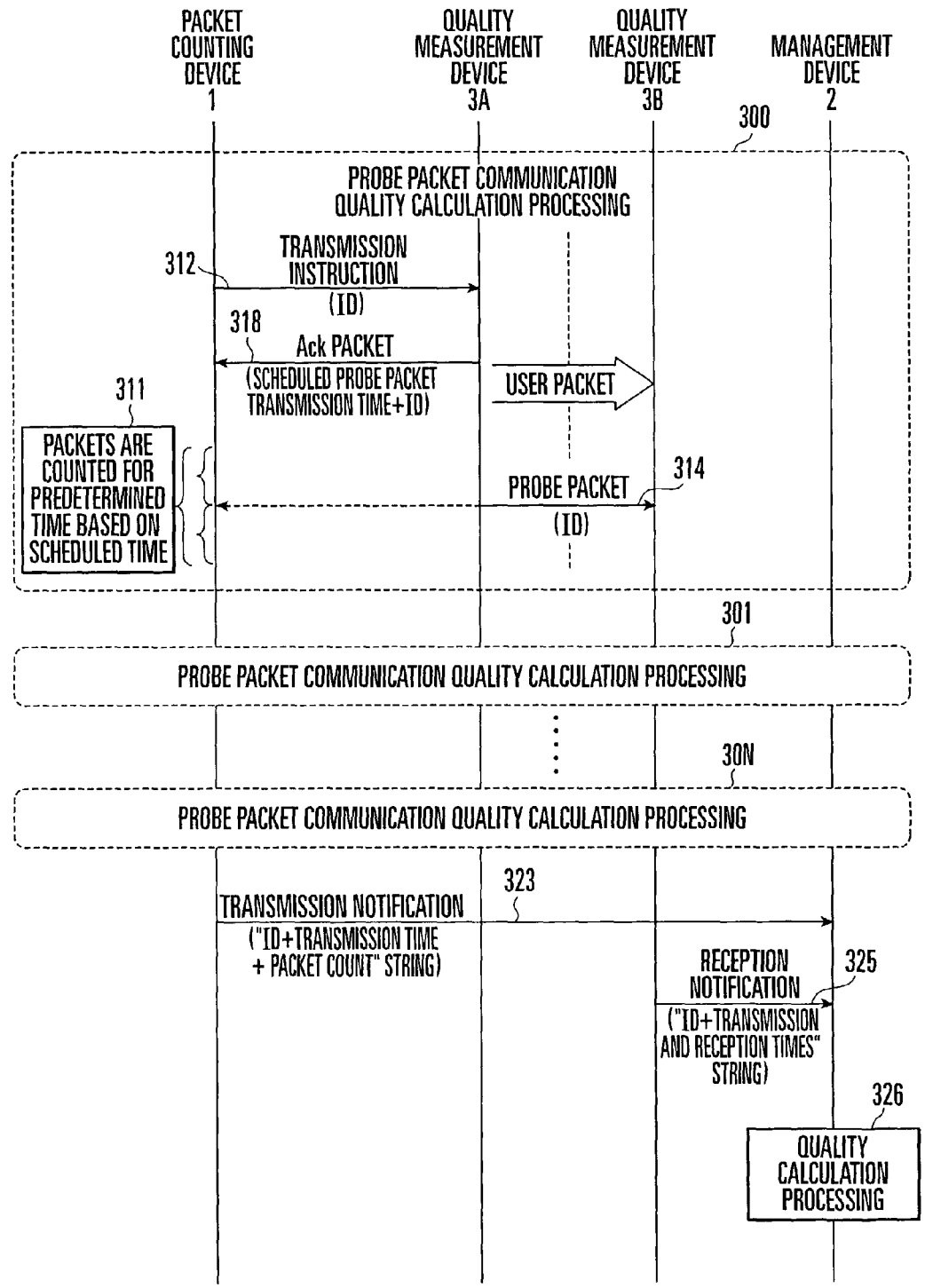
FIG. 8 is a view showing the sequence of quality measurement operations of a packet communication quality measurement system according to the fifth embodiment of the present invention.

FIG. 8 shows quality measurement operation sequence of the packet communication quality measurement system according to the fifth embodiment of the present invention.

Similar to the first embodiment (FIG. 3: step 112), a packet counting device 1 issues a transmission instruction to a quality measurement device 3A (step 312). The quality measurement device 3A schedules transmission of a probe packet a predetermined time after arrival of the transmission instruction, and sends to the packet counting device 1 an Ack message containing the scheduled time (scheduled probe packet transmission time) and ID (step 318). An example of the predetermined time is the sum of the above-mentioned packet counting time width and n times ($n=2, 3, 4, \ldots$) the delay between the packet counting device 1 and the quality measurement device 3A.

The packet counting device 1 starts counting packets after arrival of the Ack message. As the predetermined time, 0 may be used. In this case, the packet counting device 1 always counts packets every sufficiently small time slot so as to calculate the number of packets during a designated period.

Upon reception of the Ack message, the packet counting device 1 counts packets in temporal proximity to the scheduled probe packet transmission time (details of which have been described above) described in the message (step 311). The packet counting device 1 stores a pair of the ID and scheduled probe packet transmission time.

At the scheduled probe packet transmission time, the quality measurement device 3A sends a probe packet to a quality measurement device 3B (step 314). The quality measurement device 3B stores a pair of the ID of the received probe packet and the packet reception time.

In this fashion, quality measurement processing comprised of steps 312, 318, 311, and 314 is performed for one probe packet (step 300). This processing is repetitively executed a plurality of number of times (N times) at a predetermined interval corresponding to a transmission instruction or at a random interval complying with an exponential distribution (steps 301 to 30N).

After the end of the quality measurement period, the packet counting unit sends a transmission notification to the management device (step 323). The transmission notification contains a string of sets of IDs, transmission times, and packet counts stored in steps 300 to 30N (step 325). The reception notification contains a string of pairs of IDs and reception times stored in steps 300 to 30N.

Upon reception of the transmission and reception notifications, a management device 2 weights the delay distribution and loss factor of the probe packet in accordance with the number of packets in temporal proximity to each probe packet, thereby obtaining the communication quality between the quality measurement devices 3A and 3B, i.e., the one-way delay distribution and loss factor (step 326).

According to the fifth embodiment, only packets within the packet counting time width are counted. Even if the probe packet is widened, only temporary proximity packets influence an obtained delay distribution, and a high-precision quality measurement result can be obtained.

Since transmission and reception notifications corresponding to a plurality of probe packets are issued at once, the connection/disconnection load of the notifications can be suppressed. The fifth embodiment can also obtain the same operation effects as those of the first embodiment.

The sixth embodiment of the present invention will be described.

In the first to fifth embodiments, the packet counting end point of the packet counting unit coincides with the probe packet transmission time. In these embodiments, the packet counting end point of the packet counting unit 12 may be set to time at which a probe packet passes through the link of a network to be measured to which the packet counting unit 12 of the packet counting device 1 is connected. That is, a probe packet is detected on the link, and the detection time is set as the packet counting end point.

Figure 10:
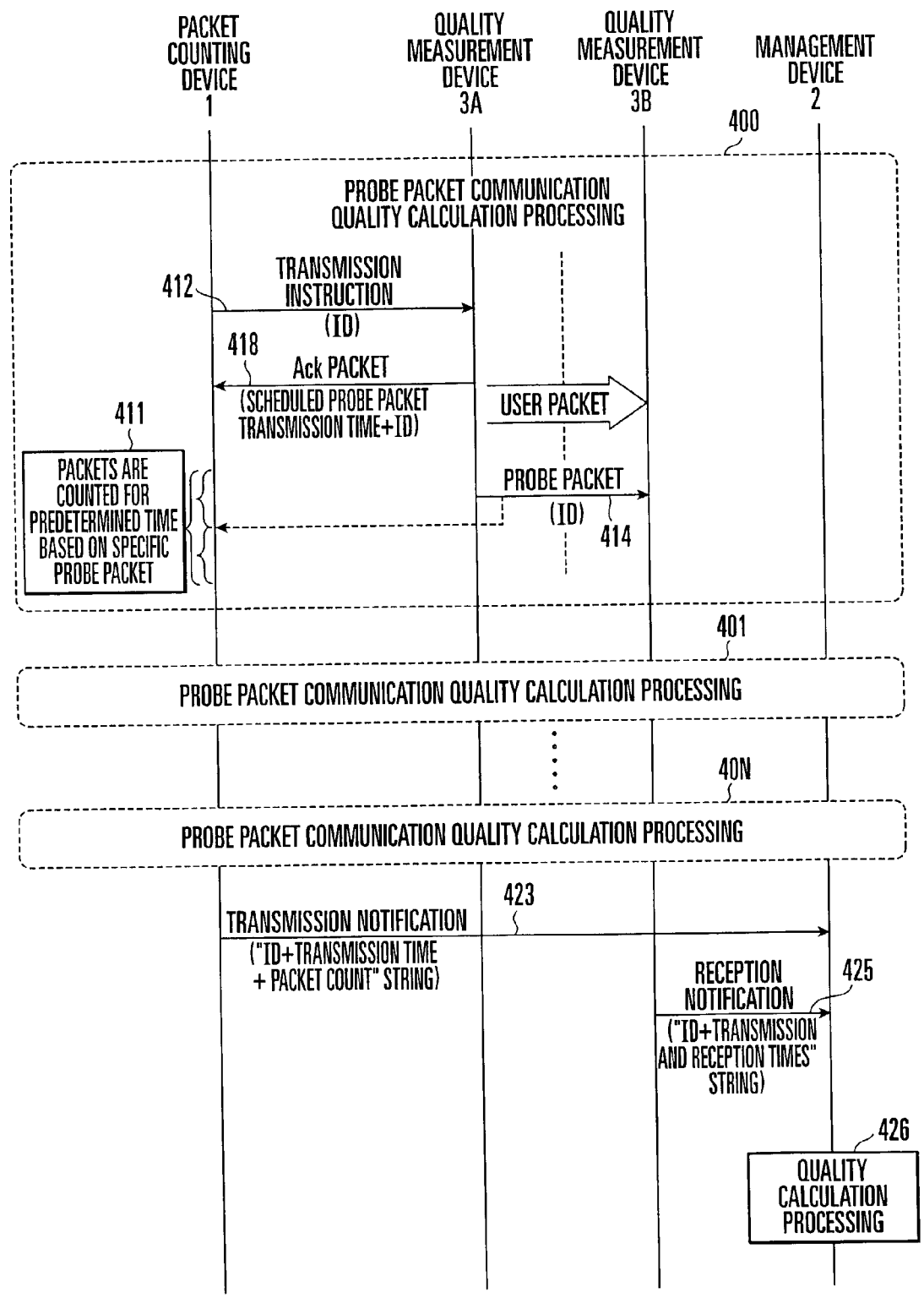
FIG. 10 is a view showing the sequence of quality measurement operations of a packet communication quality measurement system according to the sixth embodiment of the present invention.

FIG. 10 shows quality measurement operation sequence of a packet communication quality measurement system according to the sixth embodiment of the present invention. The packet communication quality measurement system operates similarly to the operation of the fifth embodiment. Steps 400, 401 to 40N, 411, 412, 414, 418, 423, 425, and 426 correspond to steps 300, 301 to 30N, 311, 312, 314, 318, 323, 325, and 326 in FIG. 8.

In the sixth embodiment, a probe packet is assigned an identifier representing that this packet is a probe packet (step 412). A packet counting device 1 monitors packets passing through a network to be measured, and stores the number of packets around time at which passage of a probe packet is detected, together with the ID of the probe packet and the probe packet transmission time (step 411).

As the identifier representing a probe packet, a specific value is written in a free field within the packet header, or a specific value is written at a specific position in a packet payload.

The sixth embodiment synchronizes the probe packet detection time and packet counting end point with each other. Even with a large delay between a quality measurement device 3A and the packet counting device 1, weighting can be achieved using the number of packets in temporal proximity to a probe packet, and higher-precision measurement can be realized.

The point where a probe packet is detected suffices to be located on the link of a network to be measured. If a probe packet is detected at a point connected to a packet counting unit 12 which actually performs packet counting, the time lag between packet counting and probe packet detection, i.e., end point can be minimized.

As has been described above, according to the present invention, probe packets are intermittently transmitted from one quality measurement device to the other quality measurement device via a packet communication network at a predetermined interval, and received by the other quality measurement device. The communication quality of each probe packet is calculated based on the transmission/reception status of the probe packet exchanged between the two quality measurement devices. The communication quality is weighted in accordance with the number of packets flowing in a desired measurement direction along a path which connects the quality measurement devices at an interval between transmission of a previous probe packet and transmission of the current probe packet. The packet communication quality between the quality measurement devices is calculated from communication qualities which are calculated and weighted for a plurality of probe packets.

Probe packets are intermittently transmitted from one quality measurement device to the other quality measurement device via a packet communication network at an interval corresponding to the number of packets flowing in a desired measurement direction along a path which connects these quality measurement devices. The probe packets are received by the other quality measurement device. The communication quality of each probe packet is calculated based on the transmission/reception status of the probe packet exchanged between the two quality measurement devices. The packet communication quality between the quality measurement devices is calculated from communication qualities calculated for a plurality of probe packets.

Measure transformation of an active measurement result can be achieved using passive measurement information. The passive measurement calculation amount and active measurement frequency can be decreased, whereas the precision can be increased.

In the present invention, only the number of user packets, which is a measurement result with a very small information amount, is used as user packet information in measuring the packet communication quality. The present invention can, therefore, avoid various problems caused by the use of many user packets in the above-mentioned passive measurement method.

The communication quality obtained from each probe packet is weighted in accordance with the number of packets actually flowing through a path which connects the quality measurement devices. The present invention can correct the communication quality difference corresponding to variations in traffic amount caused when probe packets are intermittently transmitted at a predetermined interval. The load of probe packets on the packet communication network can be reduced in comparison with the method of transmitting probe packets in accordance with a pseudo user packet generation pattern by the active measurement method described above. The present invention does not require any pseudo user packet generation pattern, and can cope with even an application or user whose user packet generation pattern is unknown.

Hence, the present invention can implement a packet communication quality measurement system which can reduce the network load and calculation amount, obtain high measurement precision, and realize extensibility.

What is claimed is:

1. A packet communication quality measurement system which has two quality measurement devices connected via a packet communication network, and a management device connected to the quality measurement devices to calculate a packet communication quality between the quality measurement devices, exchanges a probe packet between the quality measurement devices via the packet communication network, and causes the management device to calculate a packet communication quality between the quality measurement devices on the basis of a transmission/reception status of the probe packet, comprising:

a packet counting device having a packet counting unit which counts packets flowing in a desired measurement direction along a path which connects the quality measurement devices, and a probe packet transmission instructing unit which intermittently designates transmission of probe packets at a predetermined interval, wherein said probe packet transmission instructing unit notifies the management device by a transmission notification that a transmission instruction has been issued and of the number of packets counted by said packet counting unit, one quality measurement device transmits a probe packet to the other quality measurement device via the packet communication network in response to the transmission instruction from said packet counting device, the other quality measurement device notifies the management device by a reception notification of a transmission/reception status of the probe packet received from the one quality measurement device, and the management device calculates a communication quality of the probe packet on the basis of the transmission notification from said probe packet transmission instructing unit and the reception notification from the other quality measurement device, weights the calculated communication quality in accordance with the number of packets which is counted between transmission of a previous probe packet and transmission of the probe packet and obtained from the number of packets by the transmission notification, and calculates a packet communication quality between the quality measurement devices from communication qualities which are calculated and weighted for a plurality of probe packets, wherein said packet counting unit counts packets flowing in two measurement directions along the path, the one quality measurement device notifies the management device by a reception notification of transmission of probe packets to the other quality measurement device and in addition a transmission/reception status of the probe packets upon reception of probe packets which correspond to the probe packets and are sent back from the other quality measurement device, and the other quality measurement device sends back, instead of the reception notification to the management device, corresponding probe packets to the one quality measurement device upon reception of the probe packets from the one quality measurement device.

2. A packet communication quality measurement system which has two quality measurement devices connected via a packet communication network, and a management device connected to the quality measurement devices to calculate a packet communication quality between the quality measurement devices, exchanges a probe packet between the quality measurement devices via the packet communication network, and causes the management device to calculate a packet communication quality between the quality measurement devices on the basis of a transmission/reception status of the probe packet, comprising:

a packet counting device having a packet counting unit which counts packets flowing in a desired measurement direction along a path which connects the quality measurement devices, and a probe packet transmission instructing unit which intermittently designates transmission of probe packets at an interval corresponding to the number of packets counted by said packet counting unit, wherein said probe packet transmission instructing unit notifies the management device by a transmission notification of a transmission instruction and that the transmission instruction has been issued, one quality measurement device transmits a probe packet to the other quality measurement device via the packet communication network in response to the transmission instruction from said packet counting device, the other quality measurement device notifies the management device by a reception notification of a transmission/reception status of the probe packet received from the one quality measurement device, and the management device calculates a communication quality of the probe packet on the basis of the transmission notification from said probe packet transmission instructing unit and the reception notification from the other quality measurement device, and calculates a packet communication quality between the quality measurement devices from communication qualities calculated for a plurality of probe packets, wherein said packet counting unit counts packets flowing in two measurement directions along the path, the one quality measurement device notifies the management device by a reception notification of transmission of probe packets to the other quality measurement device and in addition a transmission/reception status of the probe packets upon reception of probe packets which correspond to the probe packets and are sent back from the other quality measurement device, and the other quality measurement device sends back, instead of the reception notification to the management device, corresponding probe packets to the one quality measurement device upon reception of the probe packets from the one quality measurement device.

* * * * *